US011685399B2

(12) United States Patent
Kwatra et al.

(10) Patent No.: US 11,685,399 B2
(45) Date of Patent: Jun. 27, 2023

(54) ADJUSTING DRIVING PATTERN OF AUTONOMOUS VEHICLE

(71) Applicant: International Business Machines Corporation, Armonk, NY (US)

(72) Inventors: Shikhar Kwatra, San Jose, CA (US); Nadiya Kochura, Bolton, MA (US); Jeremy R. Fox, Georgetown, TX (US); Melissa Restrepo Conde, Leland, NC (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 17/099,109

(22) Filed: Nov. 16, 2020

(65) Prior Publication Data

US 2022/0153300 A1    May 19, 2022

(51) Int. Cl.
*B60W 60/00*    (2020.01)
*B60W 40/09*    (2012.01)
(Continued)

(52) U.S. Cl.
CPC ........ *B60W 60/0013* (2020.02); *B60W 40/09* (2013.01); *G01C 21/3484* (2013.01);
(Continued)

(58) Field of Classification Search
CPC ..... A61B 5/0077; A61B 5/01; A61B 5/02055; A61B 5/02233; A61B 5/024; A61B 5/0533; A61B 5/165; A61B 5/18; A61B 5/6893; B60W 10/04; B60W 10/20; B60W 10/22; B60W 30/18163; B60W 30/182; B60W 40/08; B60W 40/09; B60W 50/0098; B60W 50/085; B60W 60/0013; B60W 2040/0872; B60W 2050/0082; B60W 2050/0083; B60W 2540/043; B60W 2540/049; B60W 2540/22; B60W 2540/221; B60W 2540/30; B60W 2555/20; B60W 2556/10;
(Continued)

(56) References Cited

U.S. PATENT DOCUMENTS 9,566,986 B1    2/2017 Gordon
10,034,630 B2    7/2018 Lee
(Continued)

OTHER PUBLICATIONS

"Automated and Autonomous Driving: Regulation Under Uncertainty", International Transport Forum, 2015, 32 pages.
(Continued)

*Primary Examiner* — Peter D Nolan
*Assistant Examiner* — Ce Li Li
(74) *Attorney, Agent, or Firm* — Monchai Chuaychoo (57) ABSTRACT

An approach for adjusting driving parameters of an AV (autonomous vehicle) based on the driving style of the passenger is disclosed. The approach utilizes existing driving patterns of the passenger and perform a dynamic comparison and correlation with safe driving patterns of the passengers themselves. Based on that evaluation, the approach would suggest the parameters for adjusting the AV driving style in order to ensure AV riding experience meets the expected level of safe and stress-less riding. Furthermore, the approach can dynamically adjust the driving style during the trip based on the reaction and feedback from the passenger.

20 Claims, 5 Drawing Sheets

(51) Int. Cl.
*G01C 21/34* (2006.01)
*G06N 20/00* (2019.01)

(52) U.S. Cl.
CPC ....... *G06N 20/00* (2019.01); *B60W 2540/049* (2020.02); *B60W 2540/22* (2013.01); *B60W 2540/221* (2020.02); *B60W 2540/30* (2013.01)

(58) Field of Classification Search
CPC ........ B60W 2556/45; B60W 2556/50; B60W 2710/20; B60W 2710/223; B60W 2720/10; B60W 2720/106; B60W 2720/125; B60W 2754/20; B60W 2754/30; G05D 1/0088; G05D 1/0212; G05D 2201/0213; G06N 20/00; G06N 3/0445; G06N 3/08
See application file for complete search history.

(56) References Cited

U.S. PATENT DOCUMENTS

| | | | | |
|---|---|---|---|---|
| 10,793,164 | B2* | 10/2020 | Likhterman | G06Q 40/08 |
| 2016/0378112 | A1 | 12/2016 | Ljubuncic | |
| 2017/0080948 | A1 | 3/2017 | Lubbers | |
| 2017/0174221 | A1* | 6/2017 | Vaughn | G05D 1/0221 |
| 2017/0369052 | A1* | 12/2017 | Nagy | B60W 30/09 |
| 2018/0148071 | A1 | 5/2018 | Kim | |
| 2018/0208209 | A1* | 7/2018 | Al-Dahle | B60W 30/18163 |
| 2019/0129422 | A1 | 5/2019 | Nojoumian | |
| 2019/0228367 | A1* | 7/2019 | Longo | G06Q 10/063112 |
| 2019/0337521 | A1* | 11/2019 | Stauber | A61B 5/4803 |
| 2019/0389483 | A1* | 12/2019 | Likhterman | B60W 50/0098 |
| 2020/0079385 | A1* | 3/2020 | Beaurepaire | G05D 1/0212 |
| 2020/0079396 | A1* | 3/2020 | Beaurepaire | G06F 16/24575 |
| 2020/0081611 | A1* | 3/2020 | Beaurepaire | G06F 3/04847 |
| 2020/0130703 | A1* | 4/2020 | Pendelton | A61B 5/165 |
| 2020/0148204 | A1* | 5/2020 | Kunz | B60W 30/162 |

OTHER PUBLICATIONS

"Improve User Satisfaction Based on Machine Learning and User Based Analytics on Autonomous Vehicles", An IP.com Prior Art Database Technical Disclosure, Authors et. al.: Disclosed Anonymously, IP.com No. IPCOM000259155D, IP.com Electronic Publication Date: Jul. 16, 2019, 5 pages.

"Method and process to use driver habits to train autonomous vehicles", An IP.com Prior Art Database Technical Disclosure, Authors et. al.: Disclosed Anonymously, IP.com No. IPCOM000230137D, IP.com Electronic Publication Date: Aug. 21, 2013, 3 pages.

"Method and system for driver and passenger profile based autonomous vehicle control", An IP.com Prior Art Database Technical Disclosure, Authors et. al.: Disclosed Anonymously, IP.com No. IPCOM000259508D, IP.com Electronic Publication Date: Aug. 16, 2019, 5 pages.

Fortuna, Carolyn, "Autonomous Driving Levels 0-5 + Implications", CleanTechnica, Dec. 2, 2017, 14 pages, <https://cleantechnica.com/2017/12/02/autonomous-driving-levels-0-5-implications/>.

Hedlund, Dr. James, "Autonomous Vehicles Meet Human Drivers: Traffic Safety Issues for States", Spotlight on Highway Safety, Prepared for Governors Highway Safety Association, 26 pages.

Schneier, Bruce, "Identifying People from their Driving Patterns", Schneier on Security, posted on May 30, 2016, 8 pages, <https://www.schneier.com/blog/archives/2016/05/identifying_peo_7.html>.

Wang et al., "Driving Style Analysis Using Primitive Driving Patterns With Bayesian Nonparametric Approaches", IEEE Transactions on Intelligent Transportation Systems, arXiv:1708.08986v1 [cs.CV], Aug. 16, 2017, 13 pages.

Wolf, Ingo, "The Interaction Between Humans and Autonomous Agents", Autonomous Driving, DOI 10.1007/978-3-662-48847-8_6, 2016, pp. 103-124.

* cited by examiner

ADJUSTING DRIVING PATTERN OF AUTONOMOUS VEHICLE

BACKGROUND

The present invention relates generally to autonomous vehicle, and more particularly to using real world driving pattern to switch driving mode.

A self-driving car, an autonomous vehicle (AV), is a vehicle that is capable of moving within an environment (i.e., drive) safely with little or no human input. Self-driving cars combine a variety of sensors to understand their surroundings, such as radar, lidar, sonar, GPS (Global Positioning System), and inertial measurement units.

Teaching autonomous vehicles can be a challenge and sometimes can rely on machine learning techniques (e.g., deep neural network, etc.) to be aware of their surrounding and obeying traffic pattern. If using a machine learning technique then AV is driven by self-learning cognitive algorithm which require extensive training and test data. During the training and tests iterations, the AV driving patterns are established. The AV driving pattern may significantly differ from the driving patterns of the AV passenger or non-active driver.

SUMMARY

Aspects of the present invention disclose a computer-implemented method, a computer system and computer program product for adjusting a driving setting for an autonomous vehicle. The computer implemented method may be implemented by one or more computer processors and may include: selecting, by one or more computer processors, a driving profile from one or more driving profiles as a driving setting for the autonomous vehicle at a beginning of a trip; monitoring, by the one or more computer processors, one or more reactions from the one or more occupants during the trip; and adjusting, by the one or more computer processors, the driving setting based on the one or more reactions.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Embodiments of the present invention provides an approach for adjusting driving parameters of an autonomous vehicle (AV) based on the driving style/preference/habit of the user/passenger. The embodiment (see FIG. 1A) can evaluate the AV (i.e., vehicle 104) driving patterns and perform a dynamic comparison and correlation with safe driving patterns of the passengers themselves (real-time analysis 125). Based on that evaluation, embodiment would suggest the parameters for adjusting the AV driving style in order to ensure AV riding experience meets the expected level of safe and stress-less riding. This involves learning of user's driving patterns (user profile 122) and transferring of those data to AVs in order to provide a similar seating experience based on reinforcement feedback and reactions monitored (monitoring 123) from various passengers (on the fly profiling). The embodiment can generate a cognitive Chabot that would engage with non-active driver in the dialog and collects the feedback (i.e., collect passenger data 124) on the riding experience via information described. For example, a user riding in AV, where the driving pattern of the AV is modeled after an "aggressive" driver, may not have an enjoyable riding experience versus a driving pattern of someone with a baby-on-board (e.g., smooth and careful). Thus, this mismatch between AV and non-active passenger driving patterns might have negative impact on passenger confidence in safety and further resulted in a not comfortable, stressful riding experience. For some passengers, the stress level might exceed the psychological and physical threshold and thus, create health risk factors for riders.

Other embodiments of the present invention may recognize one or more of the following facts, potential problems, potential scenarios, and/or potential areas for improvement with respect to the current state of the art: i) better experience from the passenger's perspective, ii) system uses the contextual collected data in order to learn the correlation between the driving patterns and level of the passenger's comfort and confidence, iii) embodiment can iteratively improves the accuracy of the recommendations based on implicit and explicit (chatbot) feedback of the passenger's experience, iv) handles multiple users "reactions" to various contextual situations including a user's health sensor data obtained from wearable devices for measuring increase/decrease in adrenalin and heart rate.

Other embodiments of the present invention can collect data (from the users) in order to learn the correlation between the driving patterns and level of the passenger's comfort and confidence. Embodiment can leverage machine learning in order to provide at runtime accurate recommendation for the driving parameters. Embodiment can iteratively improve the accuracy of the recommendations based on implicit and explicit (chatbot) feedback of the passenger's experience. Furthermore, embodiment can take action based on these situational occurrences.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

Figure 1A:
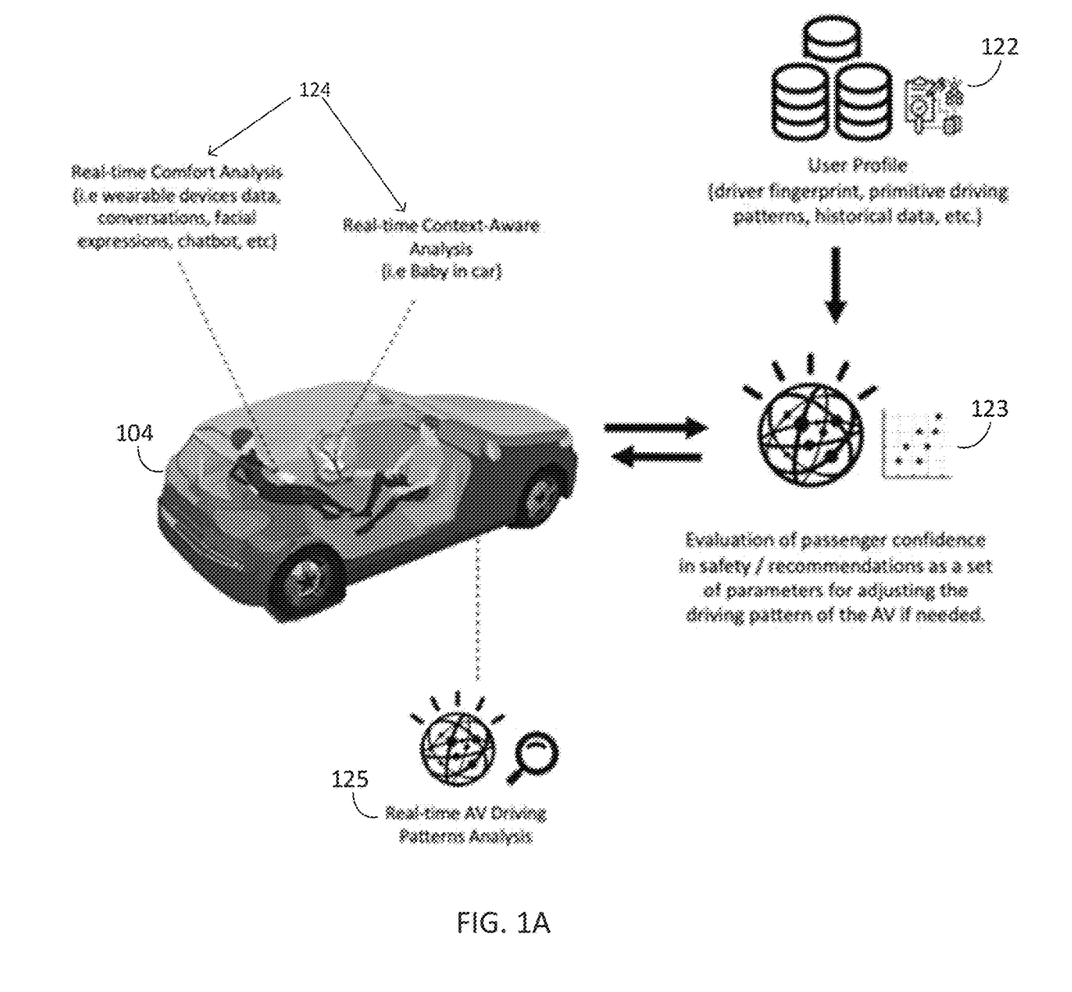
FIG. 1A is a diagram illustrating a high level overview of the functionality of the system, in accordance with an embodiment of the present invention.

FIG. 1A is a diagram illustrating a high-level overview of the functionality of the system and was already discussed in beginning. Essentially, vehicle 104 (autonomous vehicle) takes on passengers, where some of the passengers has existing driving pattern/profile (user profile 122). Vehicle 104 can suggest a suitable driving profile based on the context clues (i.e., detecting a baby on board) of the passengers and the passenger can accept the profile. Once a driving profile has been selected, the vehicle begins to travel towards the destination. The vehicle can collect (collect passenger data 124) and monitor (monitoring 123) passenger feedback. If the passenger indicates that the current drive pattern is not acceptable then the car can suggest a different one and adjust with the new driving parameter/pattern.

Figure 1B:
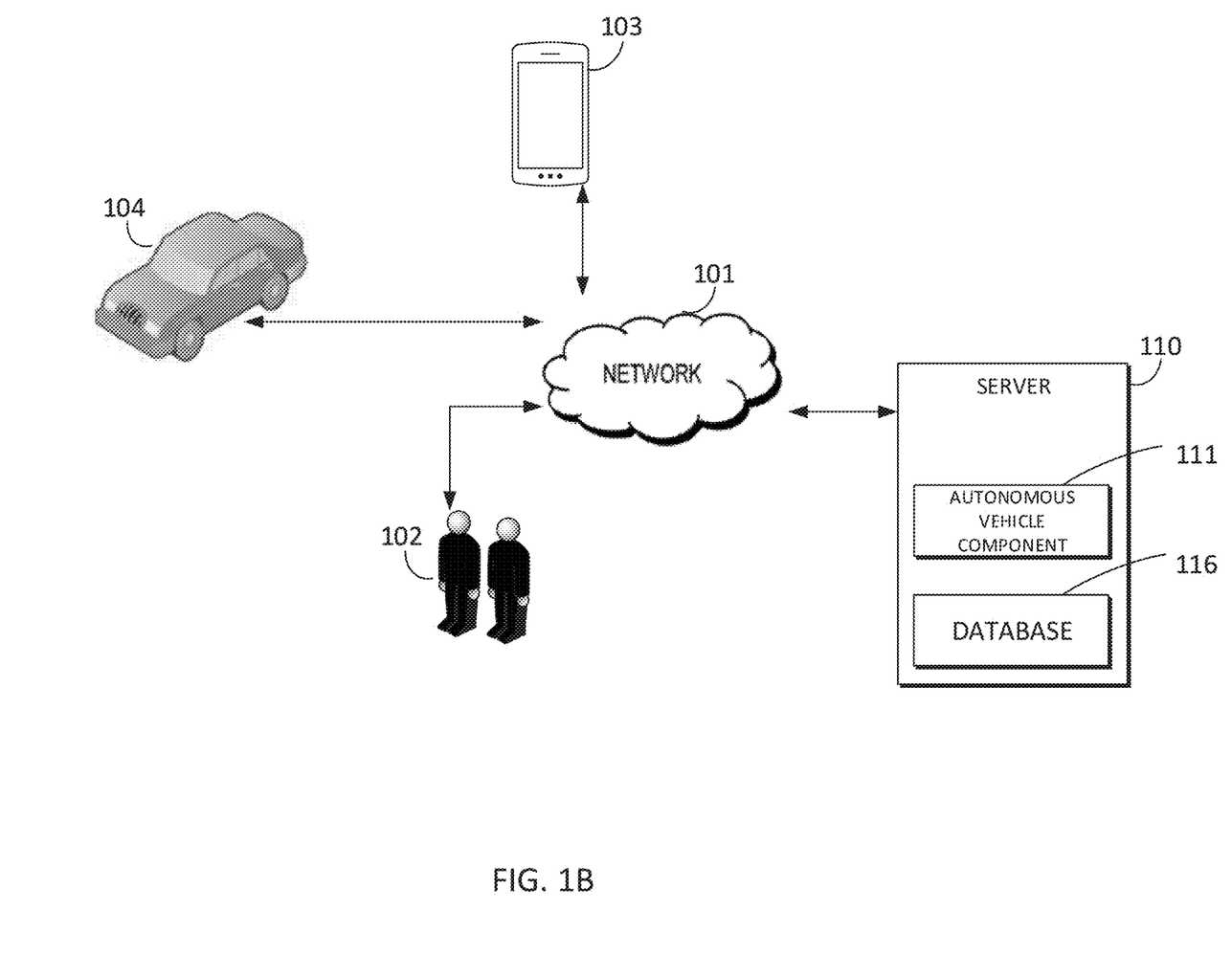
FIG. 1B is a functional block diagram illustrating a high level overview of the autonomous vehicle environment, designated as 100B, in accordance with an embodiment of the present invention.

FIG. 1B is a functional block diagram illustrating an autonomous vehicle environment 100B in accordance with an embodiment of the present invention. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims.

Autonomous vehicle environment 100 includes network 101, passengers 102, sensors 103, vehicle 104 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, sensors 103 and other computing devices (not shown) within autonomous vehicle environment 100. It is noted that other computing devices can include, but is not limited to, sensors 103 and any electromechanical devices capable of carrying out a series of computing instructions.

Passengers 102 can be users of AV. Passengers can include adults, teens and children.

Sensors 103 can be any smart device (e.g., IoT, IP camera, etc.) used for detecting objects, chemical compounds/elements, auditory signals, electromagnetic signal and images. Sensors 103 can include IoT devices, such as, cameras, olfactory, thermal sensors/imaging, microphones, and chemical detectors. Furthermore, sensors 103 can include traffic cameras, wearable smartwatches, smartphones, cameras inside AV and cameras located on the body of the AV pointed the surrounding for navigation/obstacle avoidance.

Vehicle 104 can be any vehicle (e.g., sedans, coupes, wagon, bus, etc.) that is self-driven (autonomous). Vehicle 104 can include vehicle that are not driven by wheels, such as, but it is not limited to, autonomous boats and autonomous airborne vehicle.

Server 110 can be a standalone computing device, a management server, a web server, a mobile computing device, or any other electronic device or computing system capable of receiving, sending, and processing data. In other embodiments, server 110 and digital twin server 105 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any other programmable electronic device capable of communicating other computing devices (not shown) within autonomous vehicle environment 100 via network 101. In another embodiment, server 110 represents a computing system utilizing clustered computers and components (e.g., database server computers, application server computers, etc.) that act as a single pool of seamless resources when accessed within autonomous vehicle environment 100.

Embodiment of the present invention can reside on server 110. Server 110 includes autonomous vehicle component 111 and database 116.

Autonomous vehicle component 111 provides the capability of i) integrating with AV cognitive engine interface in order to collect driving signatures and ii) provide back the recommendations for adjusting those based on personalized safe driving patterns/style. Embodiment uses contextual collected data in order to learn the correlation between the driving patterns and level of the passenger's comfort and confidence. Embodiment leverages machine learning, to analyze those data in order to provide at runtime accurate recommendation for the driving parameters. The recommendation is based on assessment of the deviation between expected driving patterns and actual driving. Furthermore, autonomous vehicle component 111 can iteratively improves the accuracy of the recommendations (i.e., for adjusting the driving) based on implicit and explicit (i.e., chatbot) feedback of the passenger's experience. It is noted that the embodiment can provide a more accurate assessment when there are data available regarding the passenger driving patterns. However, the embodiment can project the expectation of the AV driving patterns based on the passenger only riding experience available (i.e., passenger who has never driven and/or own a driver license but is familiar/always ride in a vehicle).

Database 116 is a repository for data used by autonomous vehicle component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within autonomous vehicle environment 100, provided that autonomous vehicle component 111 has access to database 116. Database 116 may store information associated with, but is not limited to, knowledge corpus, i) established/ideal driving patterns/setting for autonomous vehicle, ii) weather and traffic pattern, iii) historical driving pattern of users if one exist and iv) road construction data including road/surface conditions.

Figure 2:
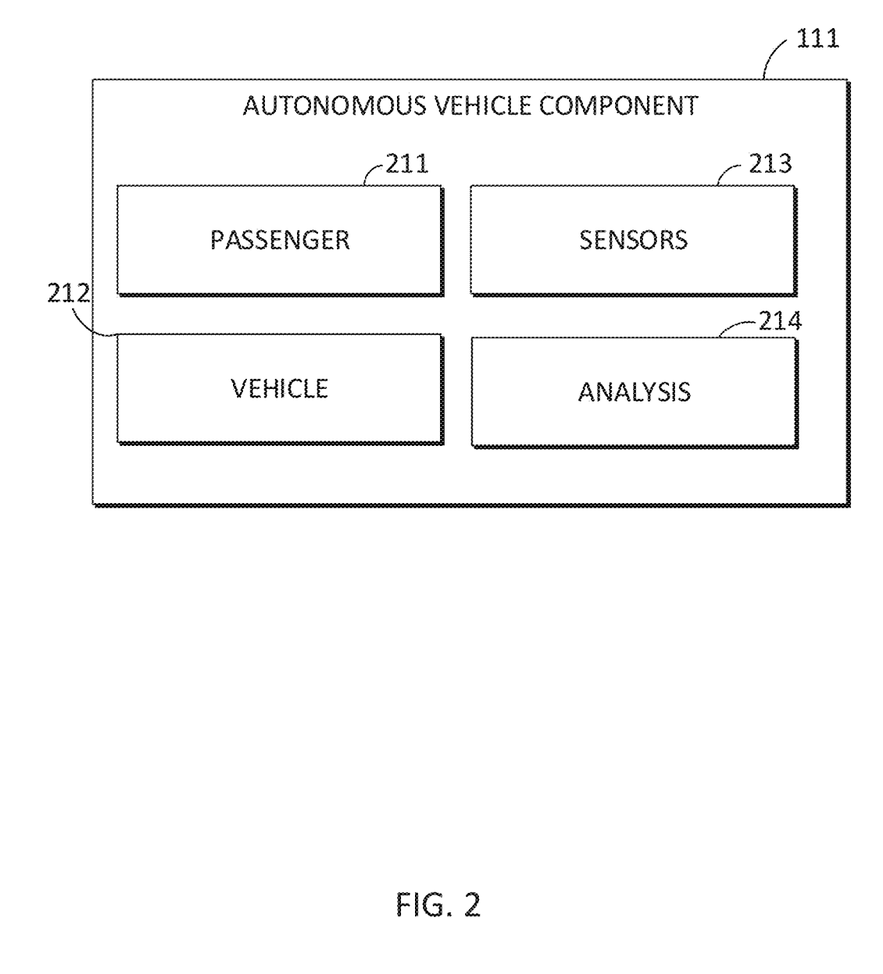
FIG. 2 is a functional block diagram illustrating the subcomponents of autonomous vehicle component 111, in accordance with an embodiment of the present invention.

FIG. 2 is a functional block diagram illustrating autonomous vehicle component 111 in accordance with an embodiment of the present invention. In the depicted embodiment, autonomous vehicle component 111 includes passenger component 211, vehicle component 212, sensors component 213 and analysis component 214.

As is further described herein below, passenger component 211 of the present invention provides the capability of communicating with data servers (e.g., social media, auto insurance, etc.) to obtain relevant information associated with potential and current passenger. Some of the information retrieved can be related to their driving fingerprint and/or related to their habits/routine. Passenger component 211 can retrieve existing driving patterns (assuming passengers has opted in for sharing such information) from a driving repository. For example, a family (e.g., father, mother and newborn infant child) is leaving the hospital. Both the father and mother has an existing driving fingerprint in a database. The father is a more aggressive driver (e.g., fast accelerating, late braking at a stop sign, frequent lane changes, etc.) and the mother is more conservative (e.g., textbook driving, gradual braking at a stop sign and waiting before accelerating, etc.).

In another embodiment, passenger component 211 can analyze and collect driving pattern of passengers at the initial stage (i.e., before riding in an AV). Passenger component 211 can analyze the driving patterns of the passenger based on his/her driving experience. This will also include the style of the driving of the manual driver. Each driver will have a personal driving corpus for pattern identification. For example, IP cameras can be positioned inside the vehicles along with diagnostic sensor features are used in order to understand/monitor user's driving style and profile the user. User's patterns are saved in a cloud database for future referencing and correlation enhancement. Passenger component 211 can filter (i.e., use any machine learning technique to exclude non-relevant data from a dataset) out non-safe patterns. Non-safe pattern (e.g., aggressive, etc.) can include, but not be limited to, i) accelerating at high rates of speed, ii) changing lanes while cutting in front of other vehicles and iii) stopping abruptly beyond normal braking speed reduction. Driving corpus can include the following data elements to establish driving patterns: i) driving fingerprint (i.e. historical pattern/detection of the driver based on OBDII/CAN interface of their personal/rental vehicle), ii) primitive driving pattern, iii) user's feedback/reaction and iv) biometric data from wearable devices that can measure increasing/decreasing adrenalin, heart rate and blood pressure. The four data elements can be weighted and sum for an accurate analysis of the driving pattern of users and corpus establishment.

As is further described herein below, vehicle component 212 of the present invention provides the capability of communicating with AV infrastructure to obtain the following information, but it is not limited to, i) vehicle location, ii) active status of the vehicle (i.e., on a trip delivering a passenger) and iii) various AV driving pattern (including the predetermined default driving profile). Continuing the use of the previous example, vehicle component 212 can determine the nearest and available AV to be sent towards the hospital where the passengers are waiting.

As is further described herein below, sensors component 213 of the present invention provides the capability of communicating with sensors (i.e., sensors 103) to obtain real-time information associated with various sensors (e.g., IoT devices, wearable devices, camera, microphones, etc.). The information obtained can be used by any other component such as, analysis component 214, passenger component 211 and vehicle component 212.

As is further described herein below, analysis component 214 of the present invention provides the capability of analyzing the collected data (e.g., from passenger component 211, vehicle component 212 and sensors component 213) to make recommendation of a driving pattern for the AV and can dynamically adjust the driving pattern of the AV based on the feedback of the passenger(s). Analysis component 214 can perform the following steps: i) retrieve AV's driving profile, ii) retrieve passenger's driving pattern, iii) compare the AV driving profile against passenger's driving patterns and iv) dynamically adjust the AV's driving pattern based on user's feedback.

Regarding step i (retrieve AV's driving profile), analysis component 214 can evaluate the AV driving patterns by fetching the rules, speed variations, maneuvers and etc. based on the sensor data and associated attributes. Regarding step ii (retrieve passenger's driving profile), analysis component 214 can either i) collect data manually by observation of the passenger's driving habit (via sensor component 213) or ii) collect historical data of the passenger (via passenger component 211) to determine the driver's fingerprint.

It is noted that there can exist a default driving profile for the AV. The default driving profile is predetermined and adjustable by the system administrator. The default driving profile is the least aggressive, very conservative and safe (i.e., following the ideal driving methodology as mandated by the rules governing each respective cities/countries for obtaining a driver's license).

Regarding step iii (comparing the AV against the passenger's driving profile), analysis component 214 can perform the patterns comparisons based on the driving corpus (e.g., "driver fingerprint", "primitive driving patterns and "user's reactions"). Embodiment can evaluate the difference in patterns is significant enough to cause the drop in passenger confidence in safety and in increased stress level. Data related to the stress level of the user can be obtained from wearable devices for measuring increasing or decreasing in blood pressure and heart rate. A PCA (principal component analysis) is can be used for feature pruning or dimensionality reduction in order words in order to simplify the evaluation of user's stress levels at varied intervals of time. For example, system can evaluate explicit and implicit feedback from the passenger on AV riding experience (via sensors 103). User's reactions under certain contextual situations is studied via R-CNN algorithm for contextual situation analysis and PCA for dimensionality reduction—for understanding user's reactions to stated situations. A GRU's (Gated Recurrent Units) can collect, as input, multivariate vectored dimensional data, which can include, user's speech features (via MFCC) are transcribed via AI that utilizes speech to text (e.g., IBM® Watson, etc.). Furthermore, the above information can be fed as numerical vectors to the GRU cells in order to create a pattern history of the user's stressful condition and spoken words. Finally, the information is correlated with user's reactions to the contextual situation, identified in previous step via R-CNN ML model. System generates cognitive chatbot that would engage with non-active driver in the dialog and collects the feedback on the riding experience via information described above.

It is noted that if there are multiple passengers in the AV and each passenger's driving style differs greatly, then an average can be used. In the prior example, of the family at the hospital where the father is an aggressive driver and mother is conservative. A scale of 1-10 can be assigned (where 1 is the most aggressive and 10 is the least aggressive). The father can be assigned a "2" and mother assigned a "10". The embodiment can calculate the average score based on the 2 and 10, wherein the average score is 6 (leaning towards least aggressive). It is noted that other contextual clues may override the system (even with a calculated average score) in selecting a driver profile based on the passenger. Since the family is being picked up from the hospital, the AV's will defer to a conservative style of driving since a patients that leave the hospital prefers to recover at home and would prefer a smooth ride home. It is noted that if the system cannot initially decide the driving style due to the average of the multiple driving profile then it will default to the most conservative (i.e., least aggressive) driving profile. For example, if there are three driving profiles with a rating of 1, 2 and 10. The average is 4.33 (closer to the aggressive side). Normally, the system would pick a driving profile that mirrors a score, but it can pick the default driving profile instead.

Regarding step iv (dynamically adjust the AV's driving pattern based on user's feedback), analysis component 214 can further applies sensor data such as cameras, sentiment analysis on text and speech data to evaluate the passenger's level of comfort and stress level during the ride as part of reinforcement learning technique (iterative mechanism). Embodiment provides recommendations as a set of parameters for adjusting the driving pattern of the AV if needed. As a result, adjusted AV driving patterns would provide safe and stress less riding experience, correlating to user's/passengers' driving states/profiles.

Other embodiments of analysis component 214 can include the use of a dynamic baseline of data (i.e., not static), but rather is evaluating the difference in patterns is significant enough to cause the drop in passenger confidence in safety and in increased stress level. This may be persistent or lack thereof. The PCA is being used for feature pruning or dimensionality reduction in order words in order to simplify the evaluation of user's stress levels at varied intervals of time. This allows the embodiment to evaluate the evolution of a driver over time as well as immediate deltas.

Other embodiments of analysis component 214 can include adjust the driving pattern of AV considering expectation of the passenger(s) and that may vary between various population groups and riding context. For example, having a baby on board assumes more conservative driving style or pattern. Other context clues can include the pick up location of passengers. For example, if AV is picking up passengers from a hospital and/or pub, it is assumed that a conservative driving style will be the default setting for the AV. Furthermore, the ability to extend this to various members/riders within the vehicle can allow for an overlay of additional novelty for plurality of use cases.

Regarding observing contextual clues, analysis component 214 can use weather, traffic and road conditions data to adjust the driving pattern after picking up passengers. For example, if the it's raining and closed to night time, then the AV may default to an ideal conservative drive setting. This can be attributed to safety consideration/limitation since the sensors that aides the driving capability of the AV may not work as well in less ideal condition and changing to a conservative driving setting may be preferred.

Figure 3:
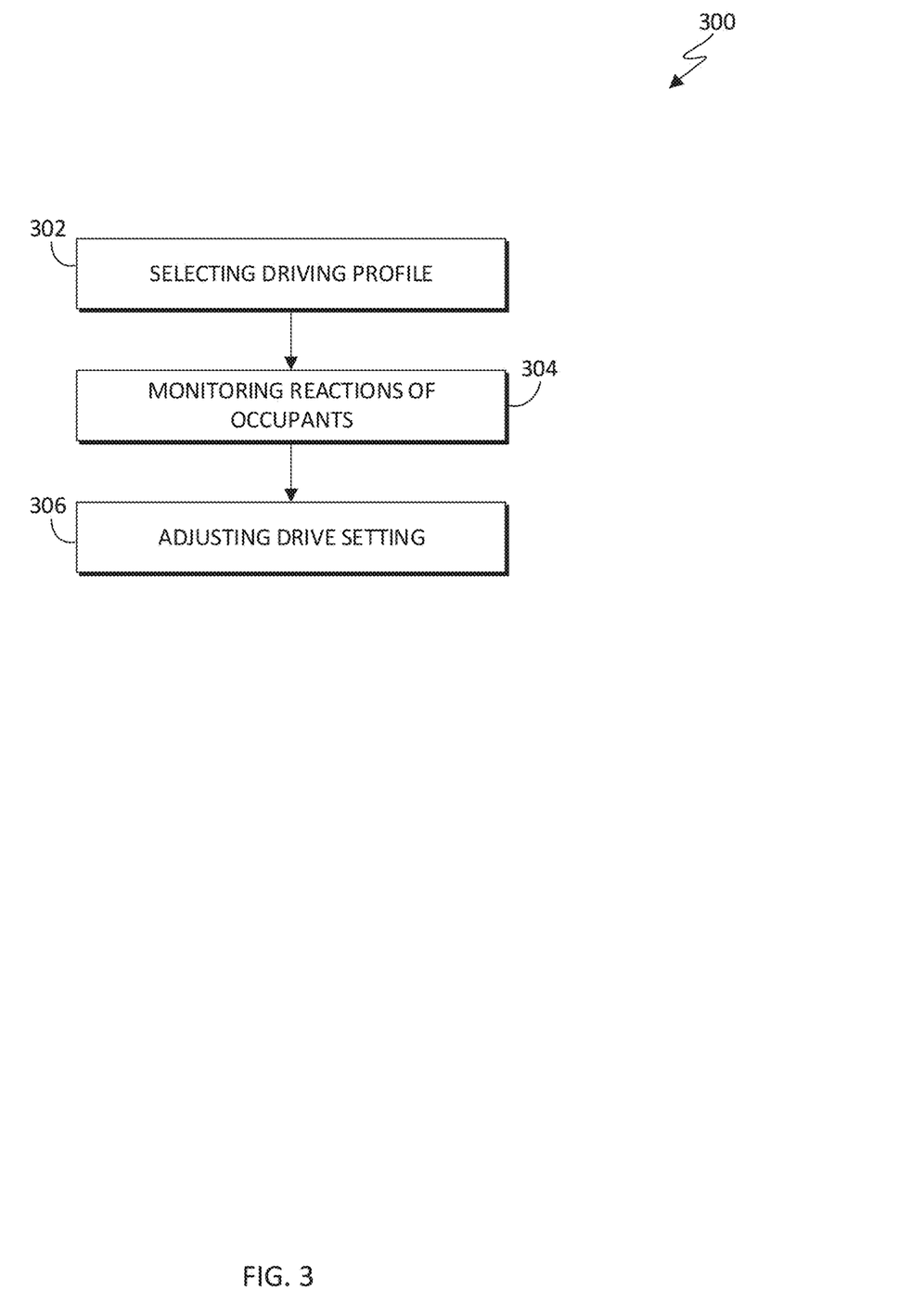
FIG. 3 is a high-level flowchart illustrating the operation of autonomous vehicle component 111, designated as 300, in accordance with an embodiment of the present invention.

FIG. 3 is a flowchart illustrating the operation of autonomous vehicle component 111, designated as 300, in accordance with another embodiment of the present invention.

Autonomous vehicle component 111 selects a driving profile (step 302). In an embodiment, autonomous vehicle component 111, through passenger component 211, selects a driving profile at the beginning of a trip. For example, passenger1 and passenger2 request an AV rideshare. Autonomous vehicle component 111, through vehicle component 212, queries an idle AV close to both passengers and sends AV_1 to the location. Both passenger1 and passenger2 typically drives and already has a driving profile created based on passenger component 211 (observation via sensors). Autonomous vehicle component 111, through analysis component 214. Each passenger has a score of "9" for their driving profile and using the average method, analysis component 214 selects a less aggressive driving profile for AV_1.

Autonomous vehicle component 111 monitors the reaction of the passengers (step 304). In an embodiment, autonomous vehicle component 111, through analysis component 214, measure the stress level of the passengers before and during the trip. For example, autonomous vehicle component 111 can measure a baseline stress level of passenger1 and passenger2 before the trip (i.e., as soon as they are in the vehicle). During the trip, autonomous vehicle component 111 continuously measures and monitors the stress level of both passengers.

Autonomous vehicle component 111 adjusts the drive setting (step 306). In an embodiment, autonomous vehicle component 111, through analysis component 214 adjusts the driving setting of the AV based on the stress level of the passengers. For example, autonomous vehicle component 111 continuously measures the current stress level of the passengers against their baseline stress level. If the stress level increases then autonomous vehicle component 111 can adjust the driving setting by selecting a less aggressive driving profile for AV. The baseline stress level (as measured by heartbeat) of passengers1 and passengers2 is around 70 beats per minute. During the trip, both passengers begins to panic (i.e., increase in heartbeat to 90) due to the sudden rain storm, autonomous vehicle component 111 can dynamically adjust the driving style/pattern/setting until both passenger's stress level reaches their baseline level (i.e., heartbeat of 70 bpm). Autonomous vehicle component 111 can adjust the AV's driving setting until the trip has concluded for both passengers.

Figure 4:
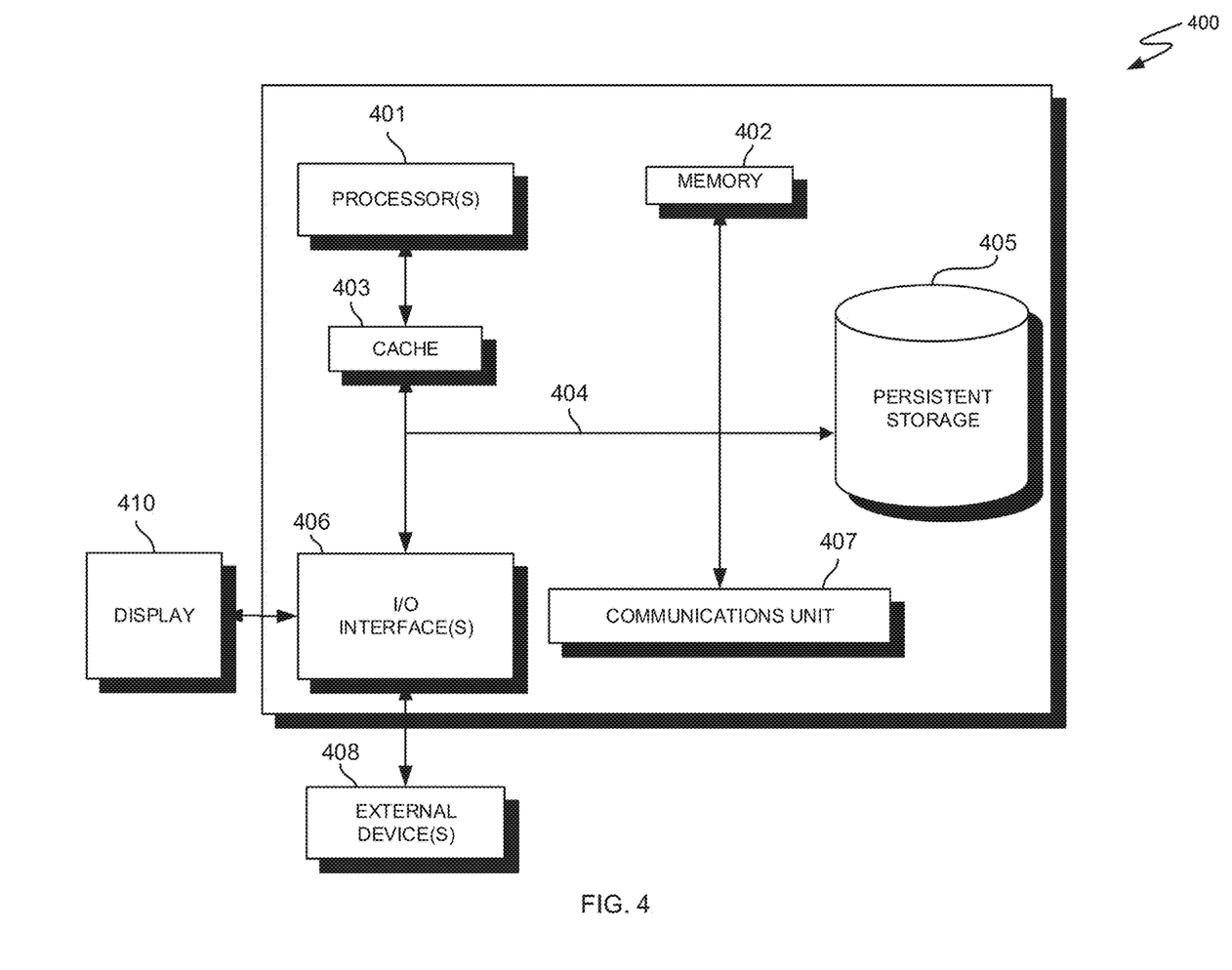
FIG. 4 depicts a block diagram, designated as 400, of components of a server computer capable of executing the autonomous vehicle component 111 within the autonomous vehicle environment 100B, in accordance with an embodiment of the present invention.

FIG. 4, designated as 400, depicts a block diagram of components of autonomous vehicle component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data x10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Autonomous vehicle component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., Autonomous vehicle component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., Autonomous vehicle component 111) used to practice embodiments of the present invention can be stored on such portable computer readable storage media and can be loaded onto persistent storage 405 via I/O interface(s) 406. I/O interface(s) 406 also connect to display 410.

Display 410 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. I t will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for adjusting a driving setting for an autonomous vehicle, the computer-implemented method comprising:
    selecting, by one or more computer processors, a driving profile from one or more driving profiles of one or more occupants as a driving setting for the autonomous vehicle at a beginning of a trip;
    monitoring, continuously by the one or more computer processors, one or more reactions from the one or more occupants during the trip;
    adjusting, continuously by the one or more computer processors, the driving setting based on the one or more reactions;
    generating, by leveraging a machine learning component, a cognitive chatbot to engage in a dialogue with the one or more occupants, wherein the dialogue includes collecting feedback of riding experience;
    recommending, by leveraging the machine learning component, a second driving profile based on the collected feedback of the riding experience;
    adjusting, by leveraging the machine learning component, the driving setting based on the second driving profile;
    recommending, by leveraging the machine learning component, a third driving profile based on passenger pick up location, wherein the machine learning component recognizes certain locations, such as a hospital, requires a conservative driving style; and
    adjusting, by leveraging the machine learning component, the driving setting based on the third driving profile.

2. The computer-implemented method of claim 1, further comprising:
    determining, by the one or more computer processors, if the one or more driving profiles exist for the one or more occupants at a beginning of the trip; and
    responsive, by the one or more computer processors, to the one or more driving profiles does not exist, selecting a predetermined default driving profile as the driving setting for the autonomous vehicle.

3. The computer-implemented method of claim 2, further comprising:
    creating, by the one or more computer processors, a new driving profile at the end of the trip based on the adjusted driving setting; and
    storing, by the one or more computer processors, the new driving profile for at least one of the one or more occupants.

4. The computer-implemented method of claim 2, further comprising:
    responsive to the one or more driving profiles does exist, determining, by the one or more computer processors, if there are more than one driving profile from the one or more driving profiles;
    determining, by the one or more computer processors, a number of occupants on the trip based on the one or more occupants at the beginning of the trip; and
    responsive to determining that there are more than one driving profile, selecting, by the one or more computer processors, one driving profile using a predetermined weighted average.

5. The computer-implemented method of claim 4, further comprising:
    determining, by the one or more computer processors, if using the predetermine weighted average of the driving profile can be selected; and
    responsive to determining that using the predetermine weighted average cannot be selected, selecting, by the one or more computer processors, the predetermined default driving profile.

6. The computer-implemented method of claim 1, selecting the driving profile from one or more driving profiles further comprises:
    retrieving, by the one or more computer processors, the driving profile from a database.

7. The computer-implemented method of claim 1, wherein monitoring the one or more reactions further comprises:
    determining, by the one or more computer processors, a baseline stress level of the one or more occupants before the trip, wherein the stress level can be detected by facial expression, blood pressure and heart rate via sensors; and
    determining, by the one or more computer processors, a trip stress level of the one or more occupants during the trip.

8. The computer-implemented method of claim 7, adjusting the driving setting based on the one or more reactions further comprises:
    dynamically adjusting, by the one or more computer processors, the driving setting to a more conservative driving profile until the trip stress level is less than or equal to the baseline stress level.

9. A computer program product for adjusting a driving setting for an autonomous vehicle, the computer program product comprising:
    one or more non-transitory computer readable storage media and program instructions stored on the one or more computer readable storage media, the program instructions comprising:
        program instructions to continuously select a driving profile from one or more driving profiles of one or more occupants as a driving setting for the autonomous vehicle at a beginning of a trip;
        program instructions to continuously monitor one or more reactions from the one or more occupants during the trip;
        program instructions, by leveraging a machine learning component, to adjust the driving setting based on the one or more reactions;
        program instructions, by leveraging the machine learning component, to generate a cognitive chatbot to engage in a dialogue with the one or more occupants, wherein the dialogue includes collecting feedback of the riding experience;
        program instructions, by leveraging the machine learning component, a second driving profile based on the collected feedback of the riding experience;
        program instructions, by leveraging the machine learning component, to adjust the driving setting based on the second driving profile;
        program instructions, by leveraging the machine learning component, to recommend a third driving profile based on passenger pick up location, wherein the machine learning component recognizes certain locations, such as a hospital, requires a conservative driving style; and
        program instructions, by leveraging the machine learning component, to adjust the driving setting based on the third driving profile.

10. The computer program product of claim 9, further comprising:
    program instructions to determine if the one or more driving profiles exist for the one or more occupants at a beginning of the trip; and
    responsive to the one or more driving profiles does not exist, program instructions to select a predetermined default driving profile as the driving setting for the autonomous vehicle.

11. The computer program product of claim 9, further comprising:
    program instructions to create a new driving profile at the end of the trip based on the adjusted driving setting; and
    program instructions to store the new driving profile for at least one of the one or more occupants.

12. The computer program product of claim 9, further comprising:
    responsive to the one or more driving profiles does exist, program instructions to determine if there are more than one driving profile from the one or more driving profiles;
    program instructions to determine a number of occupants on the trip based on the one or more occupants at the beginning of the trip; and
    responsive to determining that there are more than one driving profile, program instructions to select one driving profile using a predetermined weighted average.

13. The computer program product of claim 9, further comprising:
    program instructions to determine if using the predetermine weighted average of the driving profile can be selected; and
    responsive to determining that using the predetermine weighted average cannot be selected, program instructions to select the predetermined default driving profile.

14. The computer program product of claim 9, wherein monitoring the one or more reactions further comprises:
    program instructions to determine a baseline stress level of the one or more occupants before the trip, wherein the stress level can be detected by facial expression, blood pressure and heart rate via sensors; and
    program instructions to determine a trip stress level of the one or more occupants during the trip.

15. A computer system for adjusting a driving setting for an autonomous vehicle, the computer system comprising:
    one or more computer processors;
    one or more non-transitory computer readable storage media;
    program instructions stored on the one or more computer readable storage media for execution by at least one of the one or more computer processors, the program instructions comprising:
        program instructions to continuously select a driving profile from one or more driving profiles of one or more occupants as a driving setting for the autonomous vehicle at a beginning of a trip;
        program instructions to continuously monitor one or more reactions from the one or more occupants during the trip;
        program instructions, by leveraging a machine learning component, to adjust the driving setting based on the one or more reactions;
        program instructions, by leveraging the machine learning component, to generate a cognitive chatbot to engage in a dialogue with the one or more occupants, wherein the dialogue includes collecting feedback of the riding experience;

program instructions, by leveraging the machine learning component, a second driving profile based on the collected feedback of the riding experience;

program instructions, by leveraging the machine learning component, to adjust the driving setting based on the second driving profile;

program instructions, by leveraging the machine learning component, to recommend a third driving profile based on passenger pick up location, wherein the machine learning component recognizes certain locations, such as a hospital, requires a conservative driving style; and program instructions, by leveraging the machine learning component, to adjust the driving setting based on the third driving profile.

16. The computer system of claim 15, further comprising:
program instructions to determine if the one or more driving profiles exist for the one or more occupants at a beginning of the trip; and
responsive to the one or more driving profiles does not exist, program instructions to select a predetermined default driving profile as the driving setting for the autonomous vehicle.

17. The computer system of claim 15, further comprising:
program instructions to create a new driving profile at the end of the trip based on the adjusted driving setting; and
program instructions to store the new driving profile for at least one of the one or more occupants.

18. The computer system of claim 15, further comprising:
responsive to the one or more driving profiles does exist, program instructions to determine if there are more than one driving profile from the one or more driving profiles;
program instructions to determine a number of occupants on the trip based on the one or more occupants at the beginning of the trip; and
responsive to determining that there are more than one driving profile, program instructions to select one driving profile using a predetermined weighted average.

19. The computer system of claim 15, further comprising:
program instructions to determine if using the predetermine weighted average of the driving profile can be selected; and
responsive to determining that using the predetermine weighted average cannot be selected, program instructions to select the predetermined default driving profile.

20. The computer system of claim 15, wherein monitoring the one or more reactions further comprises:
program instructions to determine a baseline stress level of the one or more occupants before the trip, wherein the stress level can be detected by facial expression, blood pressure and heart rate via sensors; and
program instructions to determine a trip stress level of the one or more occupants during the trip.

* * * * *